(12) United States Patent
Gabbay et al.

(10) Patent No.: US 8,757,142 B2
(45) Date of Patent: Jun. 24, 2014

(54) SOLAR COLLECTOR

(76) Inventors: Shlomo Gabbay, Ashkelon (IL); Abad Luis, Kibbutz Magen (IL)

( * ) Notice: Subject to any disclaimer, the term of this patent is extended or adjusted under 35 U.S.C. 154(b) by 334 days.

(21) Appl. No.: 13/001,624

(22) PCT Filed: Jun. 25, 2009

(86) PCT No.: PCT/IB2009/052743

§ 371 (c)(1),
(2), (4) Date: Mar. 16, 2011

(87) PCT Pub. No.: WO2010/007548

PCT Pub. Date: Jan. 21, 2010

(65) Prior Publication Data

US 2011/0162640 A1    Jul. 7, 2011

(30) Foreign Application Priority Data

Jun. 29, 2008    (IL) .......................... 192499

(51) Int. Cl.
*F24J 2/44*    (2006.01)
*F24J 2/48*    (2006.01)

(52) U.S. Cl.
USPC ........... 126/589; 126/638; 126/639; 126/599; 126/595; 126/594; 126/572; 126/583; 126/584; 126/585; 165/101

(58) Field of Classification Search
CPC . F24J 2/0483; F24J 2002/4603; F24J 2/4647; F24J 2/40; F24J 2/402; F24J 2/14; F28F 9/02; F28F 9/22; F28F 9/0265; F28F 27/00; F28F 2250/06; F28F 2250/102; F28F 2250/10; F28F 9/0212; F28F 27/02; F25B 2339/0444; F28D 1/0408; F16K 31/002; F16K 17/38
USPC ......... 126/639, 638, 594, 595, 598, 676, 599, 126/572, 583, 584, 585, 589; 165/101
See application file for complete search history.

(56) References Cited

U.S. PATENT DOCUMENTS

| 403,936 | A | * | 5/1889 | Halsey .......................... 165/101 |
| 3,292,598 | A | * | 12/1966 | Miller et al. ................ 122/406.1 |
| 3,461,953 | A | * | 8/1969 | Wiegmann et al. ........... 165/244 |
| 3,487,642 | A | * | 1/1970 | Norton ............................ 60/661 |

(Continued)

FOREIGN PATENT DOCUMENTS

| DE | 102005061008 B3 | 3/2007 |
| EP | 0164327 | 12/1985 |

(Continued)

*Primary Examiner* — Kenneth Rinehart
*Assistant Examiner* — Sharla Magana
(74) *Attorney, Agent, or Firm* — Patwrite LLC; Mark David Torche (57) ABSTRACT

A solar collector, comprising: (a) a plurality of thermosiphon tubes in which water flows, each tube having a top opening and a bottom opening; (b) a top manifold having a water inlet and water outlet and disposed at the top opening of the tubes, providing both a water feed into at least one of the plurality of tubes and a water exit from the rest of the tubes; and (c) a bottom basin connecting the bottom openings of the tubes. In some embodiments the plurality of tubes are divided into at least one inlet tube and the rest as outlet tubes by a stopper disposed in the top manifold.

9 Claims, 7 Drawing Sheets

(56) References Cited

U.S. PATENT DOCUMENTS

| | | | | |
|---|---|---|---|---|
| 3,990,504 A * | 11/1976 | Kolthoff, Jr. | | 165/271 |
| 4,086,956 A * | 5/1978 | Block et al. | | 165/297 |
| 4,114,597 A * | 9/1978 | Erb | | 126/665 |
| 4,223,633 A * | 9/1980 | Alvensleben et al. | | 118/203 |
| 4,226,225 A * | 10/1980 | Niedermeyer | | 126/594 |
| 4,284,066 A * | 8/1981 | Brow | | 126/640 |
| 4,307,707 A * | 12/1981 | Stewart | | 126/572 |
| 4,309,984 A * | 1/1982 | Dorbeck | | 126/599 |
| 4,346,731 A * | 8/1982 | Sigworth, Jr. | | 137/433 |
| 4,347,093 A * | 8/1982 | Mayo et al. | | 156/242 |
| RE31,032 E * | 9/1982 | French | | 126/637 |
| 4,381,816 A * | 5/1983 | Granetzke et al. | | 165/286 |
| 4,452,231 A * | 6/1984 | El-Shayeb | | 126/584 |
| 4,474,209 A * | 10/1984 | Akhtarekhavari | | 137/559 |
| 4,599,994 A * | 7/1986 | Cole | | 126/588 |
| 4,622,951 A * | 11/1986 | Matzkanin | | 126/638 |
| 4,623,001 A * | 11/1986 | Vogler et al. | | 137/625.46 |
| 4,706,650 A * | 11/1987 | Matzkanin | | 126/638 |
| 4,928,754 A * | 5/1990 | Westerberg | | 165/134.1 |
| 5,000,259 A * | 3/1991 | Forrest | | 165/176 |
| 5,074,282 A * | 12/1991 | Reed | | 126/588 |
| 5,101,640 A * | 4/1992 | Fukushima et al. | | 62/196.4 |
| 5,305,826 A * | 4/1994 | Couetoux | | 165/103 |
| 5,931,156 A * | 8/1999 | Wang et al. | | 126/635 |
| 5,979,548 A * | 11/1999 | Rhodes et al. | | 165/284 |
| 6,655,375 B2 * | 12/2003 | Terraneo | | 126/639 |
| 6,799,631 B2 * | 10/2004 | Acre | | 165/297 |
| 7,322,399 B2 * | 1/2008 | Guerrero et al. | | 165/101 |
| 7,490,662 B2 * | 2/2009 | Eliades et al. | | 165/297 |
| 7,677,242 B2 * | 3/2010 | Carcangiu et al. | | 126/600 |
| 8,113,192 B2 * | 2/2012 | Kwak et al. | | 126/569 |
| 8,220,453 B2 * | 7/2012 | Bourke | | 126/638 |
| 8,235,034 B1 * | 8/2012 | Flaherty | | 126/589 |
| 8,347,877 B2 * | 1/2013 | Shabtay et al. | | 126/664 |
| 2003/0047300 A1 * | 3/2003 | Okumura et al. | | 165/42 |
| 2004/0035111 A1 * | 2/2004 | Ven et al. | | 60/641.8 |
| 2006/0219237 A1 * | 10/2006 | Bowen et al. | | 126/638 |
| 2007/0137639 A1 * | 6/2007 | Rhodes | | 126/570 |
| 2007/0269355 A1 * | 11/2007 | Malmqvist | | 422/224 |
| 2008/0000629 A1 * | 1/2008 | Viczena | | 165/260 |
| 2008/0264474 A1 * | 10/2008 | Frauenknecht et al. | | 136/251 |
| 2009/0032129 A1 * | 2/2009 | Yamawaki et al. | | 137/625.46 |
| 2010/0307478 A1 * | 12/2010 | Neuwen | | 126/599 |
| 2013/0008433 A1 * | 1/2013 | Hahn et al. | | 126/674 |

FOREIGN PATENT DOCUMENTS

| | | |
|---|---|---|
| EP | 1167893 A2 | 1/2002 |
| EP | 1806545 A2 * | 7/2007 |
| JP | 60038558 A | 2/1985 |
| OA | 10450 A | 3/2002 |

* cited by examiner

SOLAR COLLECTOR

FIELD OF THE INVENTION

The invention relates to solar collectors. Some embodiments of the invention relate to solar collectors operating by thermosiphon (natural convection).

BACKGROUND OF THE INVENTION

Solar collectors, as found in Israel and other locations, are typically made of metal structures comprising metallic pipes and covered by a glass pane, and are disposed in an inclined orientation. An inlet manifold at the bottom of the solar collector provides feed water that rises in thermosiphon tubes to an outlet manifold at the top of the collector from which the water exits the solar collector.

Solar collectors comprising polymeric materials are also known, as related, for example, in U.S. Pat. Nos. 4,114,597 and 4,082,082, the disclosures of which are incorporated herein by reference.

SUMMARY OF THE INVENTION

An aspect of some embodiments of the invention relates to a solar collector comprising a plurality of thermosiphon tubes and a top manifold into which water is fed into at least one tube and from which water exits from the rest of the tubes.

Another aspect of some embodiments of the invention relates to a solar collector comprising a plurality of thermosiphon tubes divided into at least one inlet tube and the rest as outlet tubes by a separating element (hereinafter 'stopper') disposed in a manifold at the top of the collector.

An aspect of some embodiments of the invention relates to a solar collector comprising a plurality of tubes operating by thermosiphon divided into at least one inlet tube and the rest as outlet tubes by a stopper disposed in a manifold at a suitable position for limiting the water temperature to a preset extent under stipulated environmental conditions.

An aspect of some embodiments of the invention relates to a solar collector comprising a plurality of thermosiphon tubes divided into at least one inlet tube and the rest as outlet tubes by a stopper disposed in a manifold at a variable position responsive to the ambient temperature and/or water temperature, for adjusting the outlet water temperature.

According to some embodiments, the stopper is manually positionable; according to other embodiments, the stopper is automatically positionable.

Another aspect of some embodiments of the invention relates to a solar collector comprising an inlet and/or outlet manifold having an air pocket (trap) providing space for the expansion of freezing water (or other fluid) in the collector, thereby preventing mechanical failure of the collector.

Another aspect of some embodiments of the invention relates to a solar collector comprising partially transparent tubes having walls comprising a pigment within a particular concentration range in order to increase and/or control the thermal efficiency of the collector.

Yet another aspect of some embodiments of the invention relates to a solar collector comprising an automatic mechanism for relieving excessive pressure in the inlet of the collector. The excessive pressure may be due to a lower flow rate in the collector tubes relative to the feed flow, for example, when the inlet and/or outlet tubes comprise small cross-sectional areas relative to the inlet feed for controlling the collector efficiency or water outlet temperature. The excessive pressure may be such a pressure capable of impeding the inlet water feed, reducing water flow in the collector, or capable of applying an inappropriate strain on the structure of the collector. By relieving the excessive pressure the operation of the collector is at least substantially maintained.

In some embodiments of the invention, the solar collector comprises:

(i) one or more blocks of a plurality of transparent or partially transparent tubes, having a top and bottom opening each, optionally pigmented for radiation collection and conversion;

(ii) a top manifold into which water is provided and exits the tubes;

(iii) a bottom basin connecting the bottom ends of the tubes; and (iv) a stopper disposed in the top manifold for dividing the tubes into inlet and outlet tubes.

According to some embodiments, the solar collector further comprises at least one of the following components:

(i) a base below the tubes, typically pigmented for radiation collection and conversion; and (ii) a cover, substantially transparent to solar radiation in and around the visible spectrum, disposed above the tubes and typically spaced apart therefrom thereby leaving a gap above the tubes.

By disposing the stopper in the top manifold between two tubes water fed into the manifold is blocked by the stopper and forced to flow down the tubes at one side of the stopper to the basin at the bottom of the tubes. The water is heated on the way down, and rises up the tubes at the other side of the stopper and is further heated as the water rises in the tubes via thermosiphon. According to the position of the stopper, a ratio of tubes (or volume or flow rate) is set and the efficiency of the collector and/or the maximal temperature of the outlet water (under given conditions) is set accordingly.

In some embodiments of the invention, the stopper position is fixed, such as in the production stage or assembly stage. Optionally, in some embodiments, the stopper position is variable. In some embodiments of the invention, the stopper position is varied manually, such as by a screw rotated by a knob or lever. Optionally or alternatively, the stopper position is varied automatically, such as by a motor or actuator responsive to the temperature of the outlet water or ambient temperature.

Preferably, without limiting, the solar collector components, optionally excluding the stopper, comprise a polymeric material. Preferably, without limiting, the polymeric material substantially comprises polycarbonate, optionally comprising additives. Preferably, without limiting, the block of tubes is producible by extrusion, optionally co-extrusion with pigments and/or other materials.

It should be noted that using a stopper to separate the plurality of tubes to inlet and outlet tubes is not mandatory and is used herein as a convenient example. Other techniques may also be used, for example, connecting the inlet pipe to the inlet tubes (which is analogous to a stopper) or employing one-way valves in the tubes in a direction corresponding to the intended flow direction, or baffles or other flow directors as known in the art.

In the specification and claims, unless otherwise specified, the term 'water' denotes any fluid suitable for use as a heat transfer medium in solar collectors.

In the specification and claims, unless otherwise specified, the terms 'top' and 'bottom' relate to the customary inclined disposition of a solar collector's plane.

In the specification and claims, unless otherwise specified, the terms 'inlet' and 'outlet' relate to water flowing in a direction into the collector or towards the bottom of the collector, and water flowing out of the collector or towards the top of the collector, respectively, or to vessels (e.g. tubes) carrying water in the corresponding directions.

In the specification and claims, unless otherwise specified, the term 'manifold' relates to a vessel for distributing or collecting water to or from a solar collector's tubes, respectively.

In the specification and claims, unless otherwise specified, the terms 'tube' and 'pipe' do not necessarily denote a cylindrical external or internal shape.

According to an aspect of some embodiments of the present invention there is provided a solar collector, comprising:

(a) a plurality of tubes in which water flows by thermosiphon action, each tube having a top opening and a bottom opening;

(b) a top manifold having a water inlet and water outlet and disposed at the top opening of the tubes, providing both a water feed into at least one of the plurality of tubes and a water exit from the rest of the tubes; and (c) a bottom basin connecting the bottom openings of the tubes.

In some embodiments, the plurality of tubes are divided into at least one inlet tube and the rest as outlet tubes by a stopper disposed in the top manifold.

In some embodiments, the stopper is disposed at a suitable position for limiting the water temperature to a preset extent under at least one of stipulated or given environmental conditions.

In some embodiments, the solar collector further comprises a manual mechanism to vary the stopper position within the manifold.

In some embodiments, the solar collector further comprises a mechanism to automatically vary the stopper position within the manifold responsive to the ambient temperature.

In some embodiments, the tubes comprise a pigment within a particular concentration range in order to at least one of increase or control the thermal efficiency of the collector.

In some embodiments, the manifold is adapted to form an air pocket therein.

In some embodiments, the solar collector further comprises an automatic mechanism for relieving excessive pressure in the collector.

In some embodiments, the tubes' walls comprise a polymeric material.

In some embodiments, the tubes are made via co-extrusion with a solar radiation absorbing pigment.

According to an aspect of some embodiments of the present invention there is provided an automatic mechanism for relieving pressure in the collector.

In some embodiments, the automatic mechanism comprises an element rotatable by water flow.

In some embodiments, the element is configured to rotate in a water flow above a predetermined pressure of the water.

According to an aspect of some embodiments of the present invention there is provided a solar collector comprising an upper manifold adapted to provide an air pocket therein, providing space for the expansion of freezing water.

BRIEF DESCRIPTION OF THE DRAWINGS

The invention may be understood upon reading of the following detailed description of non-limiting exemplary embodiments thereof, with reference to the following drawings.

Identical, duplicate, equivalent or similar structures, elements, or parts that appear in more than one drawing are generally labeled with the same reference numeral, optionally with an additional letter or letters for reference to particular objects. Dimensions of components and features shown in the figures are chosen for convenience or clarity of presentation and are not necessarily shown to scale or true perspective. For convenience of clarity, some elements or structures are not shown, or shown only partially or with different or without perspective, and duplicate, equivalent or similar parts may not be repeatedly labeled and/or described.

DESCRIPTION OF EMBODIMENTS OF THE INVENTION

The following description relates to one or more non-limiting examples of embodiments of the invention. The invention is not limited by the described embodiments or drawings, and may be practiced in various manners. The terminology used herein should not be understood as limiting unless otherwise specified.

The non-limiting section headings used herein are intended for convenience only and should not be construed as limiting the scope of the invention.

Solar Collector's Basic Structure

Figures 1A, 1B:
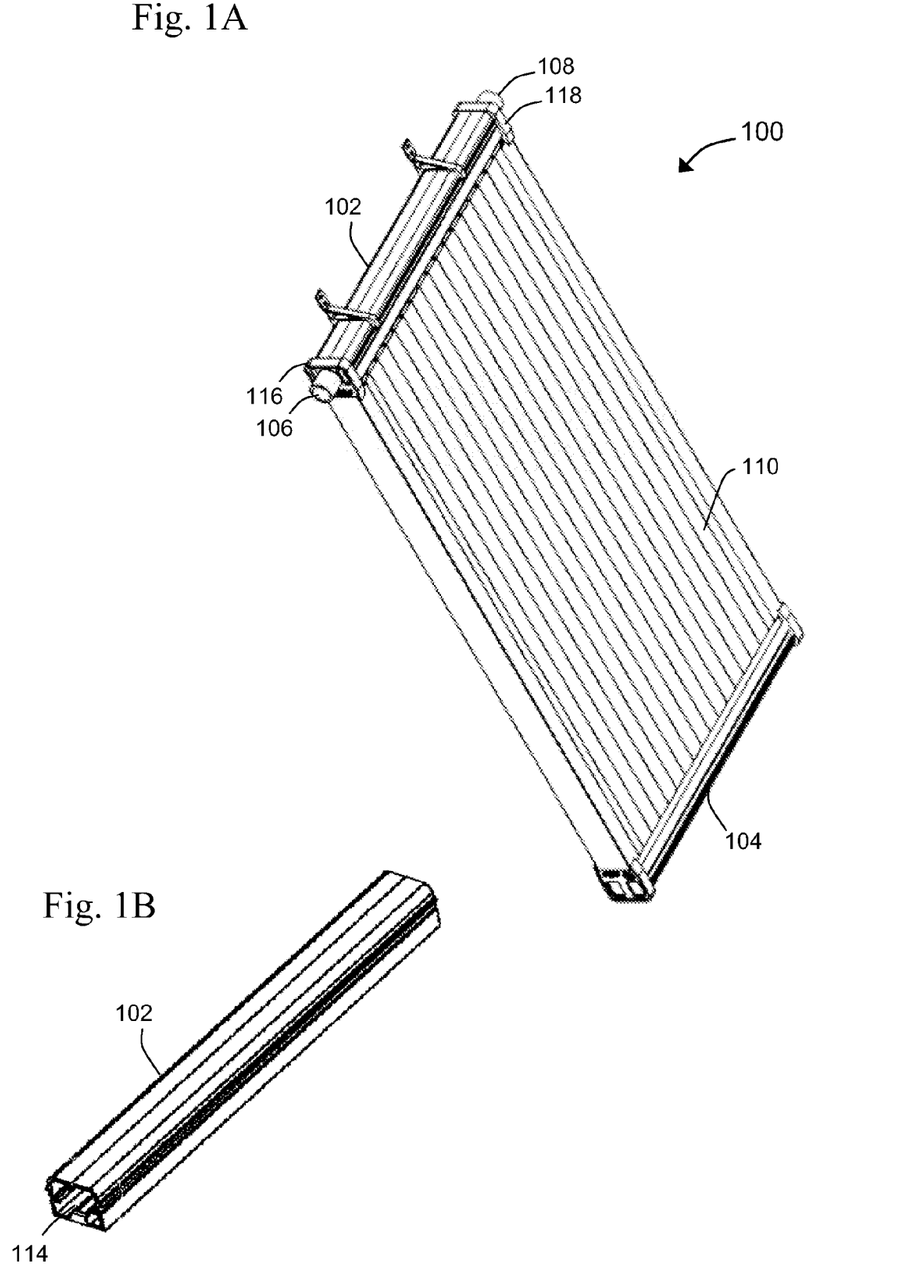
FIG. 1A schematically depicts a perspective general view of a solar collector, in accordance with an embodiment of the invention.
FIG. 1B schematically depicts a perspective view of a manifold of the solar collector of FIG. 1A without inlet and outlet pipes, in accordance with an embodiment of the invention.

FIG. 1A schematically depicts a perspective general view of a solar collector 100 comprising a transparent cover 110 having indents, a top manifold 102 comprising an inlet pipe 106 and an outlet pipe 108, and a bottom basin 104.

Preferably, without limiting, manifold 102 comprises an elongated part having a hollow 114 with internal structure (cross-section) as schematically depicted in FIG. 1B that shows a perspective view of manifold 102 without inlet and outlet pipes 106 and 108.

Inlet and outlet pipes 106 and 108 connect to manifold 102 by parts 116 and 118, respectively, which close the open ends of manifold 102 (with the exception of pipes 106 and 108).

In some embodiments, inlet pipe 106 and outlet pipe 108 are identical or similar to each other.

Preferably, without limiting, manifold 102 comprises a polymeric material such as polycarbonate and is, preferably, without limiting, fabricated by extrusion, optionally with some subsequent machining.

Figure 2A:
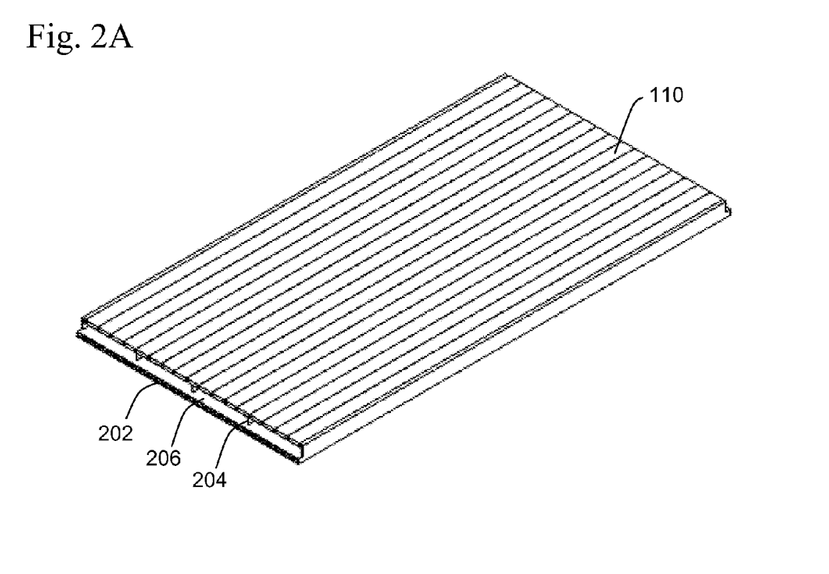
FIG. 2A schematically depicts a perspective general view of the solar collector of FIG. 1A without the manifold and basin, in accordance with an embodiment of the invention.

FIG. 2A schematically depicts a perspective general view of the solar collector 100 of FIG. 1, without manifold 102 and basin 104, comprising transparent cover 110 and a plurality of tubes 202 (shown more clearly in FIG. 2B and 2C as described below). Cover 110 is separated from tubes 202 by ribs 204, leaving a gap 206 therebetween, providing strength and stability to the structure of the solar collector.

Figure 2B:
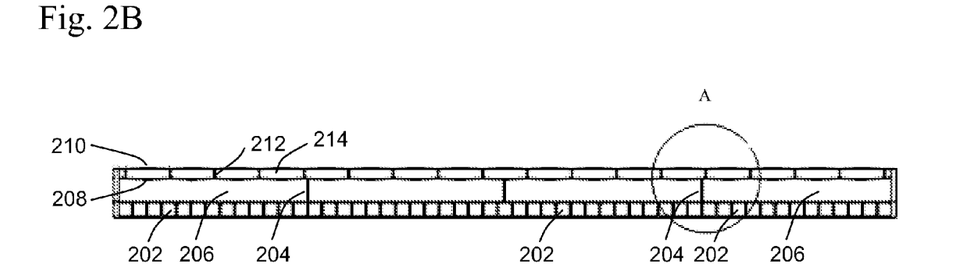
FIG. 2B schematically depicts a cross section of the solar collector of FIG. 2A, in accordance with an embodiment of the invention.

FIG. 2B schematically depicts an enlarged cross section of FIG. 2A showing tubes 202 and cover 110 which comprises two layers, internal layer 208 and outer layer 210, with ribs 212 that form hollows 214, providing mechanical strength and stability to cover 110.

Figure 2C:
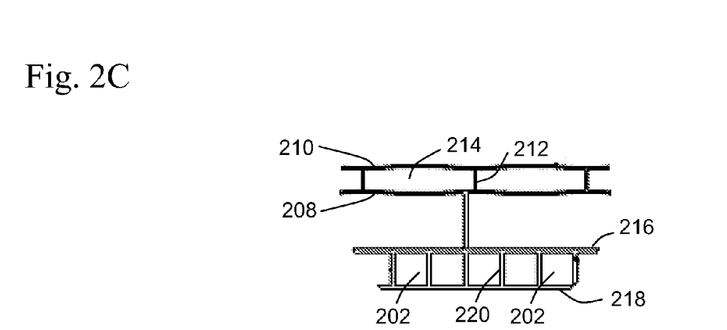
FIG. 2C schematically depicts an enlarged cross section of the solar collector of FIG. 2B, in accordance with an embodiment of the invention.

FIG. 2C schematically depicts an enlarged cross section of FIG. 2B (of a region marked as 'A' in FIG. 2B).

Cover 110 comprises transparent material that allows penetration of solar radiation, optionally comprising a polymeric material such as polycarbonate. Gap 206 and hollows 214 are typically filled with air or other fluid or material, optionally at a pressure lower than atmospheric pressure, providing thermal insulation. Cover 110 is preferably, without limiting, fabricated by extrusion, optionally with subsequent machining.

Tubes 202 (used herein synonymously as cavities 202) are formed by an upper wall 216 (towards cover 110), an opposite lower wall 218 and internal walls 220, thereby forming cavities 202. The walls of tubes 202 (divided for description convenience into walls 216, 218 and 220) preferably, without limiting, comprise a contiguous part. Optionally or alternatively, upper wall 216 and/or lower wall 218 comprises a contiguous part each, optionally with internal walls 220.

The walls of tubes 202 comprise a transparent material with a pigment that absorbs and coverts the solar radiation into heat, thus heating water that flow in tubes 202. The walls comprise a pigment in a concentration that allows radiation to partly penetrate upper wall 216, thus providing radiation to lower wall 218 (and somewhat to internal walls 220), so that water is heated by two surfaces at least. The walls of tubes 202 comprise, optionally, a polymeric material such as polycarbonate and preferably, without limiting, are fabricated by co-extrusion with the pigment. The concentration of the pigment in the walls of tubes 202 is set such as to provide maximal or determined thermal efficiency (e.g. temperature) under given conditions.

In the following discussion, reference is made also to FIGS. 1A-2C.

Fixed Stopper

Figure 3:
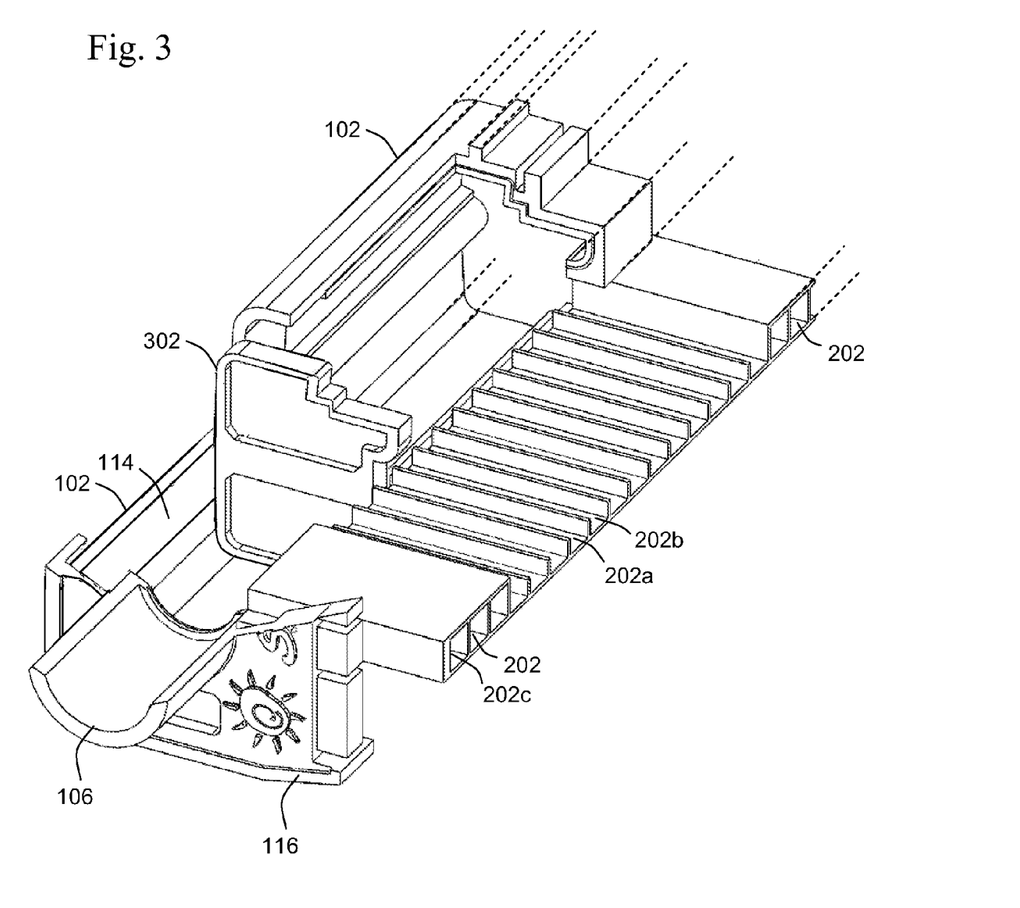
FIG. 3 schematically depicts a perspective partial cutout view of a solar collector showing how a stopper separates tubes to inlet and outlet tubes, in accordance with an embodiment of the invention.

FIG. 3 schematically depicts a perspective partial cutout view of a solar collector showing how a stopper 302 is separating tubes 202 (some of which are shown without upper wall 216) to inlet and outlet tubes.

Stopper 302 is located between tubes 202a and 202b, optionally partially blocking tubes 202a and 202b. Thus, when water is fed into inlet pipe 106, stopper 302 forces the water to flow into inlet tubes 202 from tube 202c to tube 202a (optionally excluding 202a). When the water reaches basin 104 (not shown in FIG. 3), the water rises by thermosiphon in the rest of the outlet tubes 202 (optionally excluding tube 102b).

By setting the position of stopper 302 (i.e. between particular tubes 202a and 202b) the volume of water in the inlet tube(s) and outlet tubes is determined, and/or respective flow rate is determined, and/or a ratio of the respective volumes, and/or a ratio of flow rate is determined, such that the thermal efficiency of the solar collector or the maximal temperature of the outlet water under given environmental conditions is determined.

Manually Adjusted Stopper

Figure 4A:
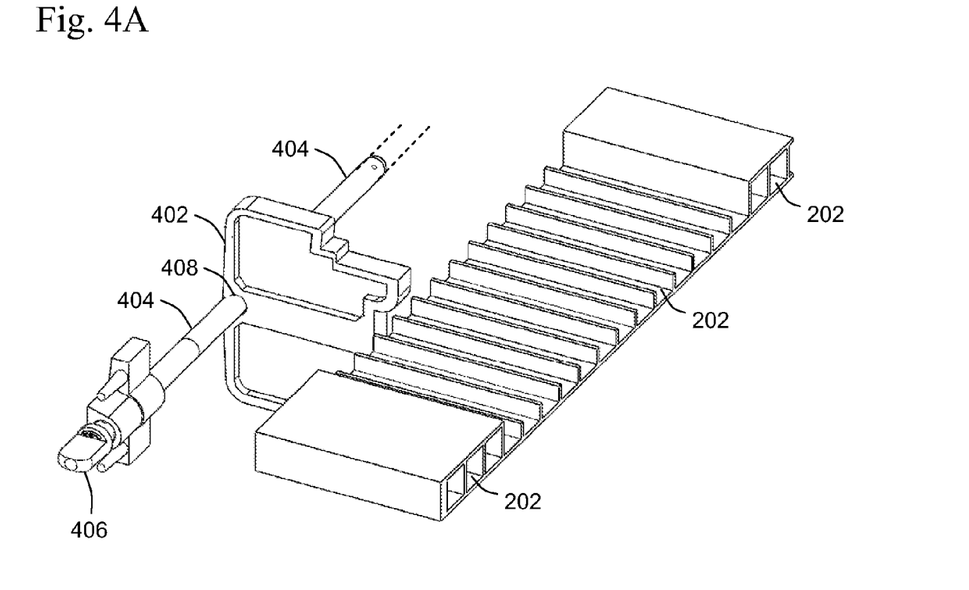
FIG. 4A schematically depicts a perspective partial view of a solar collector showing how the position of the stopper may be varied by a manual mechanism, in accordance with an embodiment of the invention.
Figure 4B:
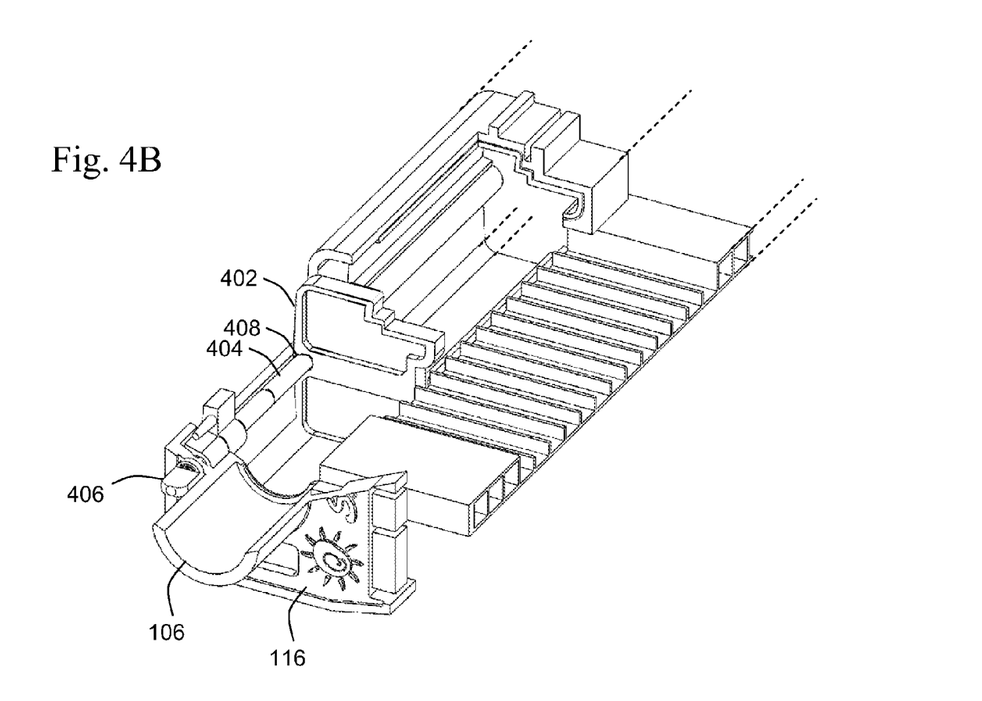
FIG. 4B schematically depicts how the stopper and mechanism of FIG. 4A is disposed in a top manifold, in accordance with an embodiment of the invention.

FIG. 4A schematically depicts a perspective partial view of a solar collector showing how the position of a stopper 402 separating tubes 202 into inlet and outlet tubes may be varied by a manual mechanism, and FIG. 4B schematically depicts how the stopper and mechanism of FIG. 4A is disposed in manifold 102.

Stopper 402 comprises a threaded hole 408 (thread not shown) in which a threaded shaft 404 (thread not shown) is disposed and stopper 402 is placed in internal structure 414 of manifold 102 so that stopper 402 cannot rotate. A handle 406 is disposed outside of manifold 102 (e.g. outside of cover 116), optionally sealed by an O-ring or other elements of mechanisms that prevent water leakage while still allowing rotation of handle 406. By turning handle 406 (e.g. a knob or other equivalent element or mechanism) shaft 404 moves stopper 402 towards or away from inlet pipe 106 inside manifold 102 thus changing the number of inlet and outlet tubes 202 to effect the operation of the solar collector as described above.

Automatically Adjusted Stopper

Figure 5A:
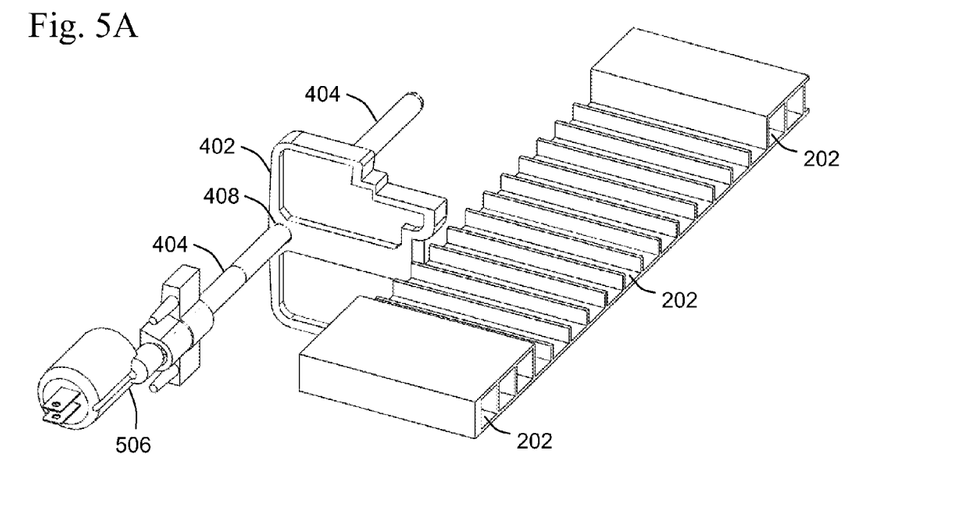
FIG. 5A schematically depicts a perspective partial view of a solar collector showing how the position of the stopper may be varied by an automatic mechanism, in accordance with an embodiment of the invention.

FIG. 5A schematically depicts a perspective partial view of a solar collector showing how the position of stopper 402, separating tubes to inlet and outlet tubes, may be varied by an automatic mechanism; and FIG. 4B schematically depicts how the stopper and mechanism of FIG. 5A is disposed in manifold 102.

Figure 5B:
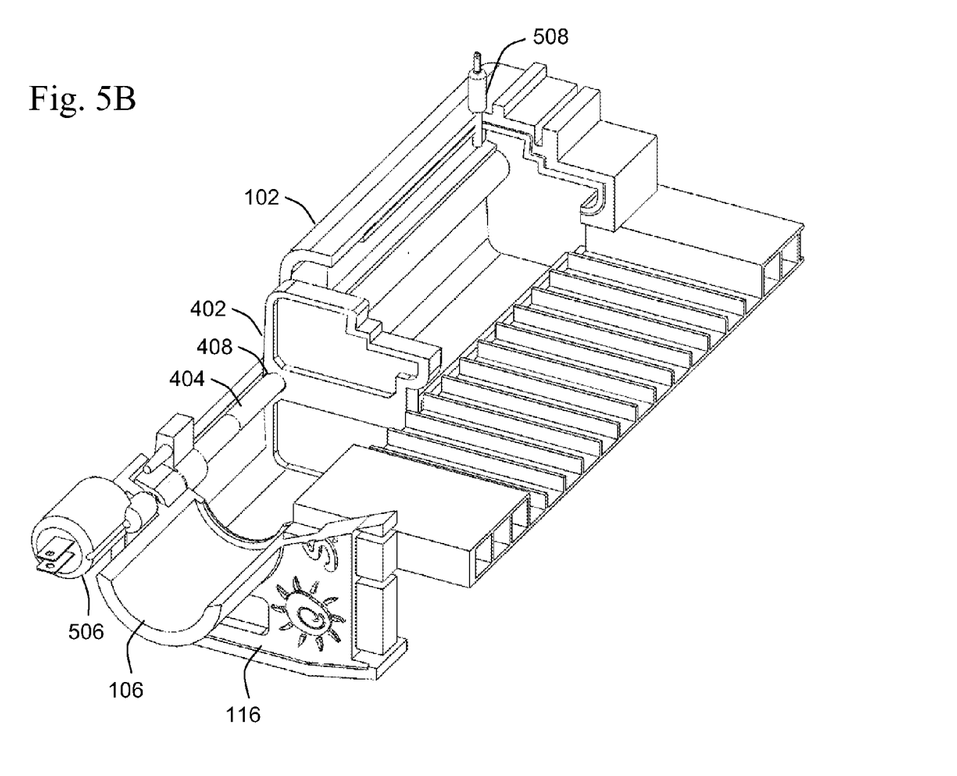
FIG. 5B schematically depicts how the stopper and mechanism of FIG. 5A is disposed in a top manifold, in accordance with an embodiment of the invention.

The structures of FIGS. 5A-B are similar to those of FIGS. 4A-B, the principal difference being that instead of manually turning handle 406 to turn shaft 404 of FIGS. 4A-B, a motor 506 is used to turn shaft 404. Motor 506 turns responsive to the temperature of outlet water as determined according to a sensor 508 disposed in the outlet section of manifold 102 (optionally sealed by an O-ring or other equivalent elements or mechanisms). By moving stopper 402 in manifold 102 the temperature of the outlet water may be kept within a given temperature.

Optionally, sensor 508 is disposed in other locations, such as outside of the solar collector so that the outlet water temperature is responsive to the ambient temperature.

Pressure Relieving Mechanism

Figure 6:
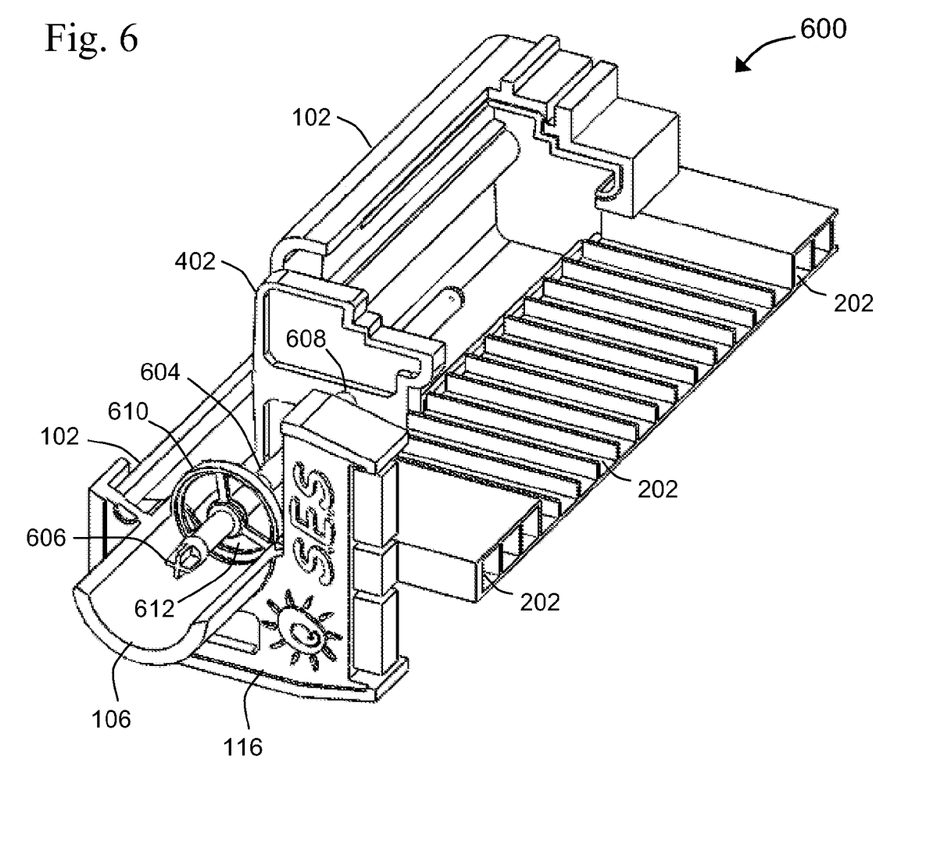
FIG. 6 schematically depicts a perspective partial cutout view of a solar collector showing a mechanism for relieving excessive pressure in an inlet pipe of a top manifold, in accordance with an embodiment of the invention.

FIG. 6 schematically depicts a perspective partial cutout view of a solar collector 600 showing a mechanism for relieving excessive pressure in inlet pipe 106 of top manifold 102.

To enable the operation of the pressure relieving mechanism, the solar collector is of the type having a movable stopper, such as described with respect to FIGS. 4A-5B.

Referring to stopper 402 of FIGS. 4A-5B, stopper 402 is placed in manifold 102 of collector 600, without being able to rotate, where stopper 402 comprises a threaded hole 608, optionally in addition to threaded hole 408. A threaded shaft 604 is disposed in hole 608 similar to how shaft 404 is disposed in hole 408 of FIG. 4A-5B.

Collector 600 comprises a propeller 606 (or other element or mechanism configured to rotate in a fluid flow) that is configured to rotate in the water flow under a sufficient pressure (excessive pressure). Propeller 606 connects to shaft 604 that is mechanically stabilized by a rotatable wheel 610 having openings 612 so that water can flow into manifold 102.

When water is fed in inlet pipe 106, if there is a sufficiently high pressure in inlet pipe 406 then propeller 606 turns about the central axis of wheel 610, whereby shaft 604 rotates and pushes stopper 402 away from inlet pipe 106, whereby additional tubes 202 between stopper 402 and the inlet are available for water flow thereby relieving the excessive pressure. In some embodiments of the invention, wheel 610 rotates under the excessive pressure such that wheel 610 comes under tension, for example, by an elastic band or spring (or other element of mechanism, not shown, hereinafter 'band') looped around shaft 604. When the excessive pressure is relieved, the band rotates shaft 604 in opposite direction, moving stopper 402 back to or towards the original position thereof.

Tube Ratio

Given a solar collector with a plurality of tubes as described above, the thermal efficiency, or maximal temperature under certain conditions, may be adjusted by setting the ratio of inlet tubes to outlet tubes.

As the water is heated by passing in the tubes, the slower the water moves the higher the temperature the water acquires (at the expense of flow rate). Therefore, dividing the tubes to equal number of inlet and outlet tubes (assuming an even number), the flow is higher and the acquired temperature is lower relative to setting only one (or fewer) inlet or outlet tubes which restricts the flow but results in a higher outlet temperature. Setting an intermediate ratio will affect an intermediate flow rate and an intermediate temperature.

Pigment Concentration

The addition of black pigment (e.g. Sep191 black Fe—Cr—Cu—Mn; Sinopigment & Enamel Chemicals Ltd) in a co-extrusion process to produce tubes 202 increases the efficiency and thus outlet water temperature. It has been found that a range of 10 to 70 grams of black pigment per kilogram of polymer (e.g. polycarbonate) produces a particularly efficient increase in outlet water temperature. In one example, a concentration of 10 to 70 grams of Sep191 pigment/kg polycarbonate produced an outlet water temperature increase of 1 to 30 degrees Celsius, respectively, in a somewhat linear relationship, versus using no pigment.

Air Pocket

Figure 7:
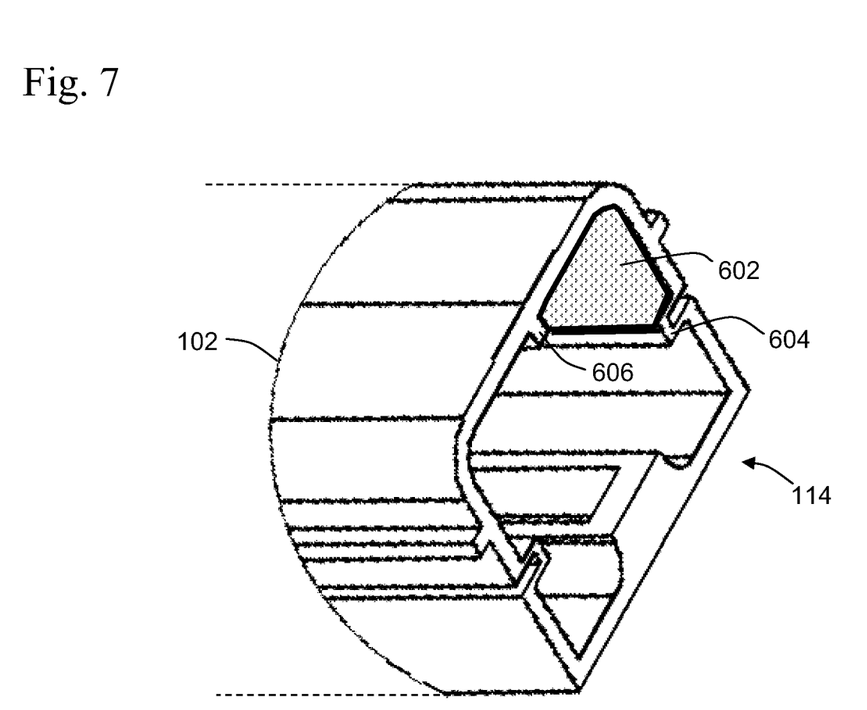
FIG. 7 schematically depicts a perspective sectional view of the top manifold having an air pocket, in accordance with an embodiment of the invention.

FIG. 7 schematically depicts a perspective view of a section of a solar collector's manifold 102 having an air pocket, in accordance with an embodiment of the invention. In the discussion that follows, reference is also made to FIGS. 1A-6.

Manifold 102 has an elongated hollow 114 having an internal structure, comprising inward protruding ribs 604 and 606, such that even when water is fed into the collector (e.g. via inlet pipe 106), air will be trapped in an air pocket as indicated by dotted region 602. As such, even in a situation where the water in the collector may freeze and expand, air pocket 602 provides space for the water to expand into, preventing damage to the collector.

General

In the specification and claims, unless otherwise specified, the terms 'about', 'close', 'approximate' and inflections thereof denote, unless otherwise specified or implied in the context, a sufficiently close functional and/or practical respective relation or location or measure or amount or quantity or degree to the referenced subject matter according to the context in which the terms or their inflections appear.

In the specification and claims, unless otherwise specified, the terms 'substantial', 'considerable', 'significant' and inflections thereof denote, unless otherwise specified or implied in the context, a measure or extent or amount or degree which is large or effective or important relative to the rest of the referenced subject matter.

In the specification and claims, unless otherwise specified, the terms 'negligible', 'slight' and 'insignificant' and inflections thereof denote, unless otherwise specified or implied in the context, a sufficiently small functional and/or practical respective relation or measure or amount or quantity or degree according to the context in which the terms or their inflections appear.

In the specification and claims, unless otherwise specified, the terms 'comprises', 'comprising', 'includes', 'including', 'having' and their inflections and conjugates denote 'including but not limited to'.

In the specification and claims, unless otherwise specified, referring to an element, object, method, step, etc. with an indefinite singular article (e.g. "a thing") does not preclude a reference to a plurality thereof (e.g. "things").

The present invention has been described using descriptions of embodiments thereof that are provided by way of example and are not intended to limit the scope of the invention. The described embodiments comprise various features, not all of which are necessarily required in all embodiments of the invention. Some embodiments of the invention utilize only some of the features or possible combinations of the features. Alternatively and additionally, portions of the invention described/depicted as a single unit may reside in two or more separate physical entities which act in concert to perform the described/depicted function. Alternatively and additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment.

In the specifications and claims, unless otherwise specified, when a range of values is recited, it is merely for convenience or brevity and includes all the possible sub-ranges as well as individual numerical values within that range. Any numeric value, unless otherwise specified, includes also practical close values enabling an embodiment or a method, and integral values do not exclude fractional values. A sub-range values and practical close values should be considered as specifically disclosed valued.

Terms in the claims that follow should be interpreted, without limiting, as defined and/or denoted and/or described in the specification.

The invention claimed is:

1. A solar collector, comprising:
    (a) a plurality of thermosiphon tubes in which water flows, each tube having a top opening and a bottom opening;
    (b) a top manifold having a water inlet and water outlet and disposed at the top opening of the tubes, providing both a water feed into at least one of the plurality of tubes and a water exit from the rest of the tubes;
    (c) a bottom basin connecting the bottom openings of the tubes; and (d) a separating element disposed in the top manifold configured to divide the plurality of tubes into at least one inlet tube and the remainder as outlet tubes, wherein the solar collector further comprises a mechanism to vary the location of the separating element within the top manifold and according to said location a ratio of inlet to outlet tubes is set.

2. A solar collector according to claim 1, wherein the mechanism to vary the separating element location within the top manifold is a mechanical mechanism.

3. A solar collector according to claim 1, further comprising a mechanism to automatically vary the separating element location within the manifold responsive to the ambient temperature.

4. A solar collector according to claim 1, further comprising a mechanism to automatically vary the separating element location within the manifold responsive to the water temperature.

5. A solar collector according to claim 1, wherein the tubes comprise a pigment within a particular concentration range in order to at least one of increase or control the thermal efficiency of the collector.

6. A solar collector according to claim 1, wherein the manifold is adapted to form an air pocket therein.

7. A solar collector according to claim 1, further comprising an automatic mechanism for relieving an excessive pressure in the collector.

8. A solar collector according to claim 1, wherein the tubes' walls comprise a polymeric material.

9. A solar collector according to claim 1, wherein the tubes are made via co-extrusion with a solar radiation absorbing pigment.

* * * * *